United States Patent [19]
Hays et al.

[11] 3,761,603
[45] Sept. 25, 1973

[54] WIRING RACEWAY
[75] Inventors: Kenneth Scott Hays, Exton, Pa.;
Gustaf Rudolph Lawson,
Willingboro, N.J.
[73] Assignee: AMP Incorporated, Harrisburg, Pa.
[22] Filed: Nov. 14, 1972
[21] Appl. No.: 306,473

[52] U.S. Cl................ 174/101, 138/157, 174/72 A
[51] Int. Cl............................ H02g 3/04, F16l 9/22
[58] Field of Search................... 174/48, 49, 68 C,
174/70 C, 72 A, 72 C, 101; 46/23, 25, 30;
52/731; 138/117, 156, 157, 162, 165, 166;
220/3.94, 4 R, 4 F; 317/122

[56] References Cited
UNITED STATES PATENTS

| | | | |
|---|---|---|---|
| 799,320 | 9/1905 | Franks | 138/157 |
| 1,756,023 | 4/1930 | Felsenthal | 138/157 X |
| 3,126,444 | 3/1964 | Taylor | 138/165 X |
| 3,156,765 | 11/1964 | Weiss | 174/72 A X |
| 3,229,029 | 1/1966 | Weiss | 174/72 A X |

FOREIGN PATENTS OR APPLICATIONS

| | | | |
|---|---|---|---|
| 362,702 | 4/1906 | France | 138/157 |
| 1,329,006 | 4/1963 | France | 174/68 C |
| 1,236,621 | 3/1967 | Germany | 174/101 |

*Primary Examiner*—Laramie E. Askin
*Attorney*—William J. Keating et al.

[57] ABSTRACT

A wiring raceway has identical, relatively flat, elongated base and cover members and a pair of identical, relatively flat, elongated side members. The base and cover members have resiliently deformable marginal channels shaped to receive either of a pair of opposite edges of each of the side members. A first edge of each of the side members is shaped to be received and retained within its respective marginal channel of the base member while a second edge of each of the side members is shaped to be received within its respective marginal channel of the cover member but to allow removal of the cover member from the side members for access to the interior of the wiring raceway without separating the side members from the base member. All members are shaped to facilitate cutting or mitering on location during installation.

28 Claims, 5 Drawing Figures

PATENTED SEP 25 1973

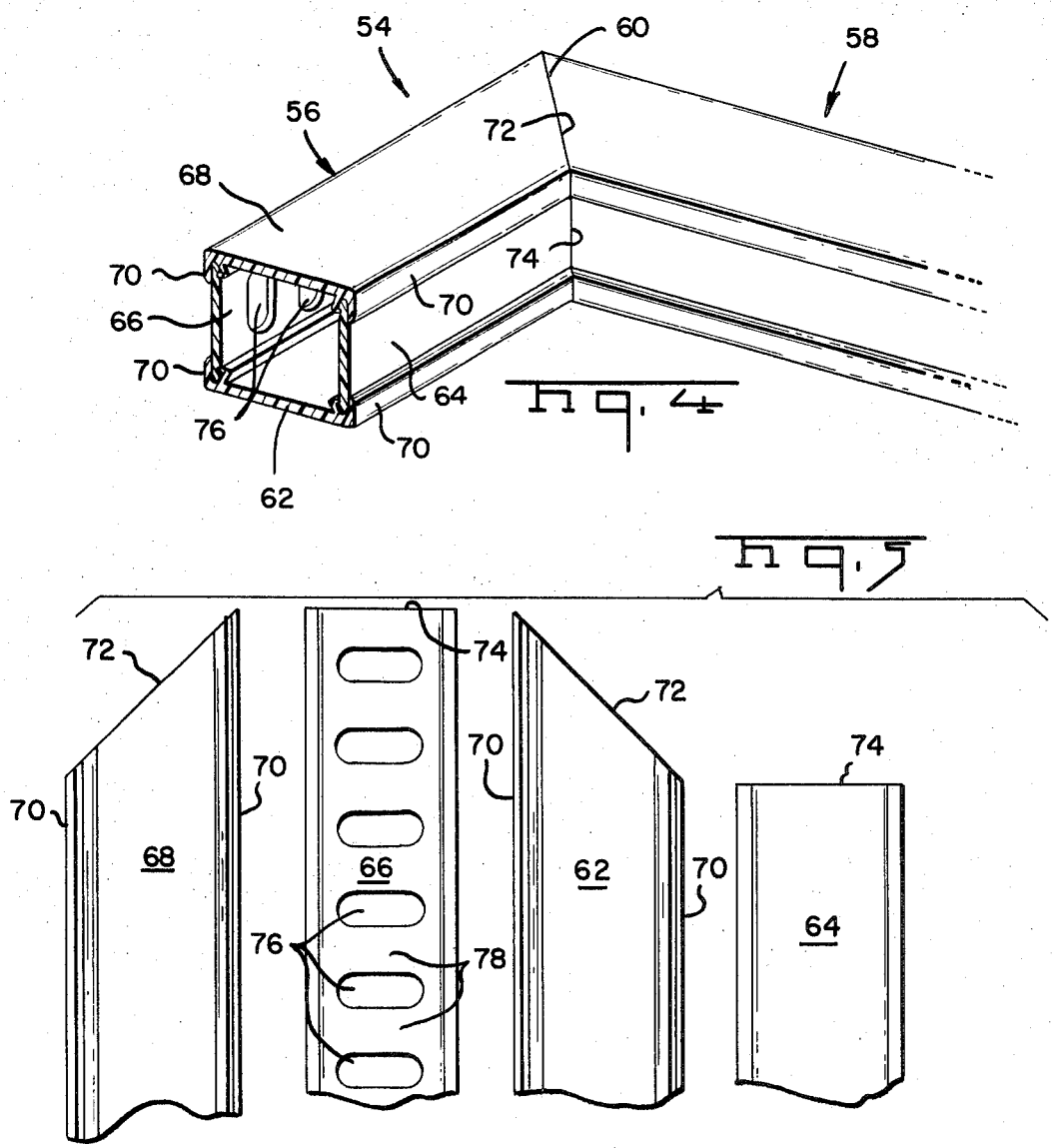

WIRING RACEWAY

BACKGROUND OF THE INVENTION

1. Field of the Invention

This invention relates to a wiring raceway and more specifically to a wiring raceway assembled from separate, identical side members and separate, identical base and cover members, which members can be easily cut or mitered on location during installation. The cover member can be removed from the assembled wiring raceway without separating the side members from the base member.

2. Description of the Prior Art

In the use of electrical equipment, a plurality of wires are often extended between the various components to electrically join them one to the other. These wires are collected along common predetermined paths to be housed within a protective structure, commonly called a wiring raceway. The shape of the path and the dimensions of the structure are often tailored during installation to accommodate the specific locations of the components and the quantity of wiring required. After the structure is complete, it is not uncommon to require access to the interior of the structure to repair the wiring or to make wiring changes as the electrical system or components are altered.

Wiring raceway structures heretofore utilized had generally included an elongated, U-shaped body which provided adequate protection for the wiring but which caused storage, inventory and installation problems. Although wiring raceways such as those disclosed in U.S. Pat. Nos. 3,156,765 and 3,229,029 offered some improved features to reduce storage space and inventory requirements of the unassembled raceway components prior to installation and to simplify subsequent installation of the assembled raceway, it has been found that the features of the afore-mentioned patents do not provide for the full realization of these objectives. Specifically, these prior art wiring raceways disclose separate bottom, side walls and cover pieces which were joined to form an assembled wiring raceway rather than having a U-shaped body and a separate removable cover as had been previously utilized. The separate pieces were easier to store than had been the U-shaped body and the flexibility that resulted from being able to match various sizes of side walls with various sizes of bottom pieces reduced the overall inventory requirement that had theretofore been necessary to provide the same variety in dimensions for the wiring raceway. These prior art raceways nevertheless required an inventory including each of the three different pieces to satisfy these dimensional varieties.

Installation was made easier with these prior art wiring raceways because the separate pieces were easier to cut and miter on location than had been the U-shaped body. However, some of the pieces were L-shaped or included right-angled extensions which inherently complicated cutting and mitering.

SUBJECT OF THE INVENTION

The wiring raceway of the present invention eliminates the aforementioned problems and disadvantages of the wiring raceways used heretofore.

It is, therefore, an object of the present invention to provide a wiring raceway having a removable cover member to allow access to its interior and to a plurality of electrical circuit wires housed therein.

It is another object to provide a wiring raceway of the type described which is constructed of a minimal number of differently shaped members to reduce inventory requirements.

It is a further object to provide a wiring raceway of the type described which is constructed of four relatively flat pieces capable of orderly, efficient storage while occupying a minimum space and of simplified cutting and mitering during installation on location.

To accomplish these and other objects, the disclosed wiring raceway includes a pair of identical side members and identical base and cover members. Each of the base and cover members has at its opposite longitudinal margins a resiliently deformable channel shaped to receive either of two opposite tapered edges of the side member and thereby cause the side member to extend generally perpendicularly from the base or cover member. Each of the side members includes a pair of depressions which are respectively adjacent each of the opposite tapered edges to form a ridge therebetween. A lip of the channel extends into the depression when the side member is inserted into the channel. The shapes of the ridges and depressions at the opposite edges of each side member are different to cause a first edge to be securely retained within the channel of the base member while the second edge is removably retained within the like channel of the cover member. Each member used in the construction of the disclosed wiring raceway has a relatively flat shape to simplify cutting and mitering on location as required during installation.

BRIEF DESCRIPTION OF THE DRAWINGS

FIG. 3 is a cross-sectional view of the wiring raceway as shown in FIG. 2 with the members disconnected.

FIG. 4 is a fragmentary perspective view of the disclosed wiring raceway in a typical installation configuration; and FIG. 5 is a plan view of some of the members as required to provide the wiring raceway configuration shown in FIG. 4.

DESCRIPTION OF THE PREFERRED EMBODIMENT

Figure 1:
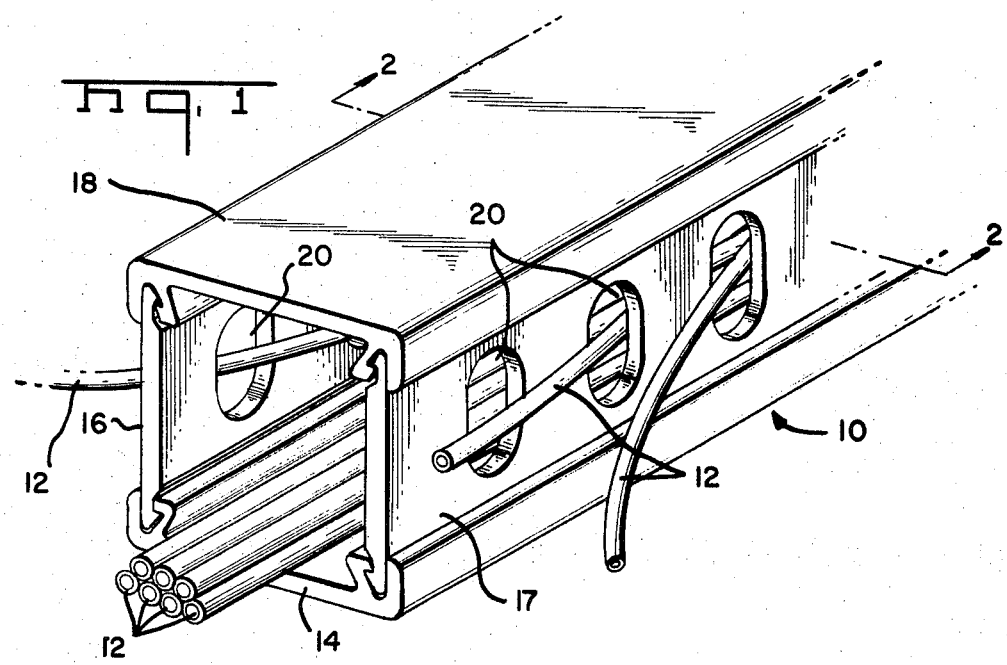
FIG. 1 is a fragmentary perspective view of the invention as installed to provide housing for a plurality of wires.

Referring to the drawings, there is shown at 10 in FIG. 1 a wiring raceway forming the preferred embodiment of the present invention which is mountable on a support structure (not shown) and houses a plurality of wires 12. The wiring raceway 10 includes a base member 14, a pair of identical side members 16, 17 and a cover member 18 which is identical to the base member 14. In the preferred embodiment, the identical side members 16, 17 and the identical base member 14 and cover member 18 are made of a resiliently deformable material such as polyvinyl chloride, by extrusion from only two different extrusion dies. The side members 16, 17 may be provided with a plurality of holes 20 which are cut during manufacture after extrusion. The holes 20 provide ventilation for the wires 12 housed within the wiring raceway 10 and provide a path for individual or groups of wires 12 to and from the interior of the wiring raceway 10, if desired. Holes (not shown) may be drilled through the base member 14 during manufacture or on location, as desired, to provide one of several possible means known in the art for securing the wiring raceway 10 to a support structure.

Figure 2:
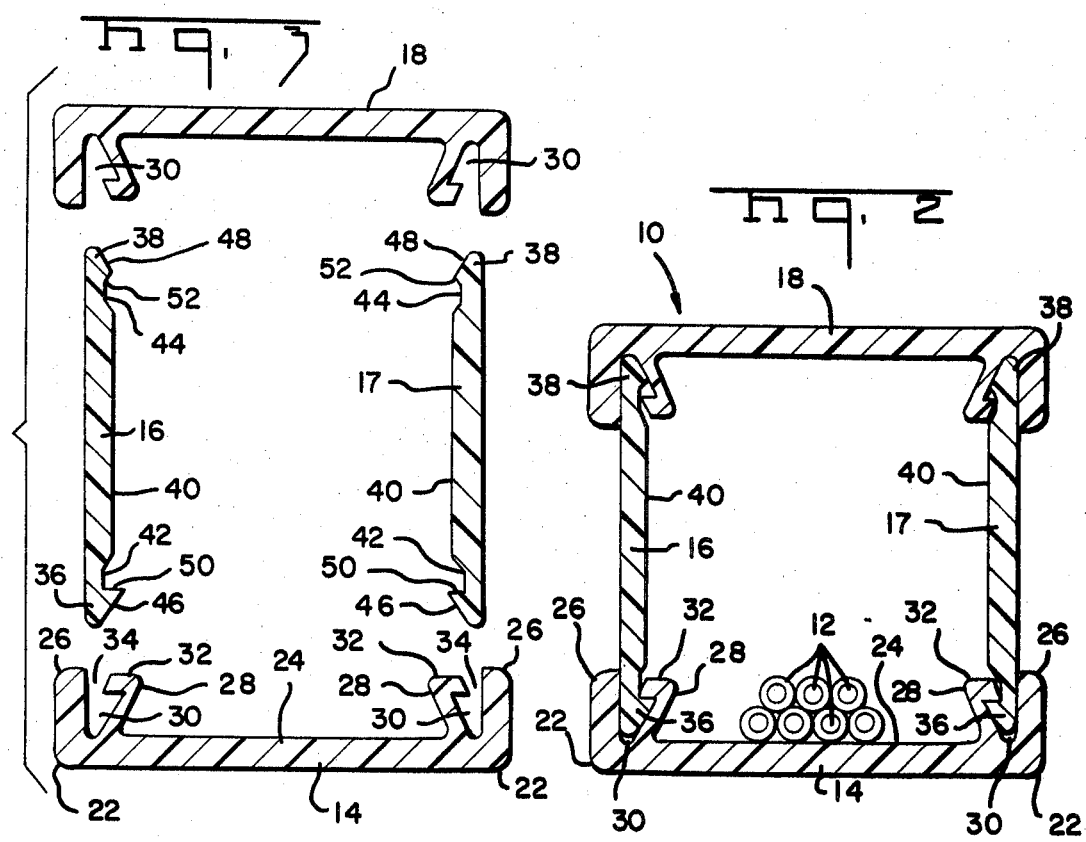
FIG. 2 is a cross-sectional view of the wiring raceway as seen along line 2—2 in FIG. 1.

As shown in FIGS. 1, 2 and 3, various features of the wiring raceway 10 have been presented in exaggerated form to more clearly illustrate the invention. Specific dimensions of an acceptable wiring raceway are provided for example later with an explanation of their significance.

Since the base member 14 and the cover member 18 are identical, only the features of the base member 14 will be specifically described but such description will be equally applicable to the cover member 18. The base member 14 includes a pair of opposite longitudinal margins 22 and an interior surface 24. Extending generally perpendicularly from the interior surface 24 at each margin 22 of the base member 14 is an integral outer ridge 26. Displaced inwardly from the outer ridge 26 along the interior wall 24 of the base member 14 is an integral inner ridge 28. The inner ridge 28 extends outwardly from the interior surface 24 generally parallel with respect to the outer ridge 26 to form a resiliently deformable channel 30 therebetween which extends longitudinally along the margin 22. Projecting outwardly from the extended end of the inner ridge 28 toward the outer ridge 26 is a lip 32. The lip 32 and the outer ridge 26 define a mouth 34 of the channel 30 therebetween, which mouth 34 has a cross-sectional width less than the cross-sectional width of the channel 30 located inwardly from the lip 34.

Because the side members 16, 17 are identical, platelike extrusions, a description of the features of one is equally applicable for the other. The side member 16 has a lower edge 36 and an upper edge 38 which edges are tapered to facilitate their respective insertion into the channels 30 of the base member 14 and the cover member 18. Displaced inwardly from the edges 36, 38 along an interior surface 40 of the side member 16 are depressions 42, 44 respectively. Each of a pair of shoulder 46, 48 is respectively defined between the depression 42 and the edge 36 and between the depression 44 and the edge 38. The cross-sectional width of each of the shoulders 46, 48 is greater than the cross-sectional width of the mouth 34 of the channel 30 so that the ridges 26, 28 must be displaced one from the other to allow full insertion of the tapered edges 36, 38 into their respective channels 30. However, the displacement of each of the depressions 42, 44 from its respective one of the edges 36, 38 is such that when the edges 36, 38 are fully inserted into their respective channels 30, the lips 32 extend respectively into the depressions 42 and 44 with the interior dimensions of the channels 30 proportioned to fully accommodate the edges 36, 38 and shoulders 46, 48 therein. Removal of the side member 16 from the channel 30 thus requires sufficient force to again displace the ridges 26, 28 one from the other as the shoulder 46, or 48 is withdrawn.

As best seen in FIG. 3, the shape and dimensions of the depressions 42, 44 and of the shoulders 46, 48 are different to thereby alter the force required to withdraw their respective edges 36, 38 from the channels 30. It can be seen that a slope 50 of the depression 42 extending downwardly from the shoulder 46 is steeper than a corresponding slope 52 of the depression 44. Further, the cross-sectional width of the shoulder 46 is greater than the cross-sectional width of the shoulder 48. The combination of the steeper slope 50 and wider shoulder 46 requires a greater force to be applied to withdraw the edge 36 from its respective channel 30 than that force required to withdraw the edge 38 from its channel 30. The slope 50 produces increased frictional resistance at the lip 32 of its respective channel 30 while the slope 52 more readily slides along its respective lip 32 to slowly force the inner ridge 28 away from the outer ridge 26 to release the edge 38 of the side member 16. Even if some displacement of the inner ridge 28 from the outer ridge 26 were to result from the application of force to withdraw the lower edge 36, still greater force is required to remove the lower edge 36 than that required to remove the upper edge 38 because the additional width of the shoulder 46 must produce greater deformation of the ridges 28, 26 one from the other before the edge 36 can be fully withdrawn from the channel 30. Although the preferred side member 16 includes both a steeper slope 50 and a wider shoulder 46 for the lower edge 36, either feature alone would produce the same additional resistance to the withdrawal of the lower edge 36 from the channel 30.

During installation, the base member 14 is secured to a support structure and the lower edges 36 of the side members 16, 17 are respectively inserted into the opposite marginal channels 30 of the base member 14. After the wires 12 are installed within the interior of the partially assembled raceway 10 as shown in FIG. 1, the cover member 18 is installed by inserting the edges 38 of the side members 16, 17 respectively in the opposite channels 30 of the cover member 18. Upward force then applied to the cover member 18 will cause its removal from the side members 16, 17 while the retention features associated with the lower edges 36 of the side members 16, 17 insure retention of the side members 16, 17 within the base member 14.

A typical installation, as shown in FIG. 4 generally at 54, includes two lengths of wiring raceway 56, 58 which are positioned perpendicularly with respect to each other in a horizontal plane to meet at an angle 60. To tailor the lengths of raceway 56 and to form the angle 60, a base member 62, a pair of side members 64, 66 and a cover member 68 must be cut and/or mitered on location as shown in FIG. 5.

In the typical installation shown at 54, the members 62, 64, 66 and 68 were cut by hand with a pair of shears. The thickness of the base member 62 and the cover member 68 at the center was about 0.065 inch and the height of each of a pair of marginal ridge pairs 70 was about 0.255 inch. These dimensions were small enough to facilitate mitering the base and cover members with shears, as shown at 72, as if there were they planar and had a uniform cross-sectional thickness. It was further found that cutting the marginal ridge pairs 70 did not alter their ability to retain the side members 64, 66. Since the thickness of the side members 64, 66 was only 0.075 inch, they too were cut at 74 without affecting their retaining features.

As seen in FIG. 5, a plurality of holes 76 is provided in the side member 66 for the purposes explained hereinabove. The width of each hole 76 is less than the width of a portion 78 of the side member 66 that separates the holes 76. This configuration enables one to selectively position the cuts required for a predetermined length of the side member 66 at the portions 78 between the holes 76 so that ends of the side members 66 will not be weakened by being cut at one of the holes 76.

Although the wiring raceway installation 54 shown in FIG. 4 shows an angle to one side in a horizontal plane, it should be obvious that the various members described hereinabove are equally capable of being cut and/or mitered to produce angles in a vertical plane. For angles in a vertical plane, the base and cover members would be cut at right angles and the side members would be mitered.

What is claimed is:

1. A wireway mountable on a support structure comprising:

a pair of identical elongated side members, each of said side members having a side and a pair of tapered longitudinal edge portions, said side of said side members having a longitudinal depression transversely displaced inwardly from said edge portions to define a longitudinal shoulder adjacent each of said edge portions, a first region of said depression adjacent a first of said shoulders having a slope extending downwardly from said first shoulder which is steeper than a slope of a second region of said depression adjacent a second of said shoulders extending downwardly from said second shoulder;

a resiliently deformable elongated base member mountable on said support structure and having a side remote from said support structure and at each of its opposite longitudinal margins a pair of ridges extending outwardly from said side of said base member to define a channel therebetween which is shaped to receive either one of said shoulders of said side member, a first ridge of said pair of ridges having a lip extending toward a second ridge of said pair of ridges and projecting into a corresponding one of said first and second regions of said depression when said either one of said shoulders is received within said channel, said lip defining a mouth of said channel having a cross sectional width less than the maximum cross sectional width of said channel, said cross sectional width of said mouth being less than the cross sectional thickness of said side member at said either one of said shoulders; and a cover member identical to said base member, whereby when said first shoulders of each of said side members are respectively received within said channels of said base member and said second shoulders of each of said side members are respectively received within said channels of said cover member, said cover member may be readily removed from said side members for access to the interior of said wireway while said side members are securely retained by said base member.

2. A wireway as set forth in claim 1, wherein asid second ridges of said base member extend respectively from each of said longitudinal margins; and said first ridge is disposed inwardly from said second ridge on said base member.

3. A wireway as set forth in claim 1, wherein said lip of said first ridge is disposed substantially parallel to said side of said base member and includes a retaining surface facing a base of said channel; and said slope of said first region of said depression is substantially perpendicular to said side of said side member.

4. A wireway as set forth in claim 1, wherein at least one of said side members has a plurality of wire access and ventilating openings extending therethrough.

5. A wireway mountable on a support structure comprising:

a pair of identical elongated side members, each of said side members having a side and a pair of tapered longitudinal edge portions, said side of said side members having a longitudinal depression transversely displaced inwardly from said edge portions to define a longitudinal shoulder adjacent each of said edge portions, the cross-sectional thickness of said side member at a first of said shoulders being greater than the cross sectional thickness of said side member at a second of said shoulders;

a resiliently deformable elongated base member mountable on said support structure and having a side remote from said support structure and at each of its opposite longitudinal margins a pair of ridges extending outwardly from said side of said base member to define a channel therebetween which is shaped to receive either one of said shoulders of said side member, a first ridge of said pair of ridges having a lip extending toward a second ridge of said pair of ridges and projecting into a region of said depression adjacent each of said shoulders when said either one of said shoulders is received within said channel, said lip defining a mouth of said channel having a cross sectional width less than the maximum cross sectional width of said channel, said cross sectional width of said mouth being less than said cross sectional thickness of said side member at said either one of said shoulers; and a cover member identical to said base member, whereby when said first shoulders of each of said side members are respectively received within said channels of said base member and said second shoulders of each of said side members are respectively received within said channels of said cover member, said cover member may be readily removed from said side members for access to the interior of said wireway while said side members are securely retained by said base member.

6. A wireway as set forth in claim 5, wherein said second ridges of said base member extend respectively from each of said longitudinal margins; and said first ridge is disposed inwardly from said second ridge on said base member.

7. A wireway as set forth in claim 5, wherein at least one of said side members has a plurality of wire access and ventilating openings extending therethrough.

8. A wireway as set forth in claim 5, further comprising:

a first of said regions of said depression adjacent said first shoulder having a slope extending downwardly from said first shoulder which is steeper than a slope of a second of said regions of said depression adjacent said second shoulder extending downwardly from said second shoulder.

9. A wireway as set forth in claim 8, wherein said second ridges of said base member extend respectively from each of said longitudinal margins; and said first ridge is disposed inwardly from said second ridge on said base member.

10. A wireway as set forth in claim 8, wherein at least one of said side members has a plurality of wire access and ventilating openings extending therethrough.

11. A wireway as set forth in claim 8, wherein said lip of said first ridge is disposed substantially parallel to said side of said base member and includes a retaining surface facing a base of said channel; and said slope of said first region of said depression is substantially perpendicular to said side of said side member.

12. A wireway as set forth in claim 11, wherein at least one of said side members has a plurality of wire access and ventilating openings extending therethrough.

13. A wireway as set forth in claim 11, wherein said second ridges of said base member extend respectively from each of said longitudinal margins; and said first ridge is disposed inwardly from said second ridge on said base member.

14. A wireway as set forth in claim 13, wherein at least one of said side members has a plurality of wire access and ventilating openings extending therethrough.

15. A wireway mountable on a support structure comprising:

a pair of identical elongated side members, each of said side members having a side and a pair of tapered longitudinal edge portions, said side of said side members having a longitudinal depression transversely displaced inwardly from each of said edge portions to define a longitudinal shoulder adjacent each of said edge portions, a first of said depressions having a slope extending downwardly from a first of said shoulders which is steeper than a slope of a second of said depressions extending downwardly from a second of said shoulders;

a resiliently deformable elongated base member mountable on said support structure and having a side remote from said support structure and at each of its opposite longitudinal margins a pair of ridges extending outwardly from said side of said base member to define a channel therebetween which is shaped to receive either one of said shoulders of said side member, a first ridge of said pair of ridges having a lip extending toward a second ridge of said pair of ridges and projecting into said depression when said either one of said shoulders is received within said channel, said lip defining a mouth of said channel having a cross sectional width less than the maximum cross sectional width of said channel, said cross sectional width of said mouth being less than the cross sectional thickness of said side member at said either one of said shoulders; and a cover member identical to said base member, whereby when said first shoulders of each of said side members are respectively received within said channels of said base member and said second shoulders of each of said side members are respectively received within said channels of said cover member, said cover member may be readily removed from said side members for access to the interior of said wireway while said side members are securely retained by said base member.

16. A wireway as set forth in claim 15, wherein said second ridges of said base member extend respectively from each of said longitudinal margins; and said first ridge is disposed inwardly from said second ridge on said base member.

17. A wireway as set forth in claim 15, wherein said lip of said first ridge is disposed substantially parallel to said side of said base member and includes a retaining surface facing a base of said channel; and said slope of said first depression is substantially perpendicular to said side of said side member.

18. A wireway as set forth in claim 15, wherein at least one of said side members has a plurality of wire access and ventilating openings extending therethrough.

19. A wireway mountable on a support structure comprising:

a pair of identical elongated side members, each of said side members having a side and a pair of tapered longitudinal edge portions, said side of said side members having a longitudinal depression transversely displaced inwardly from each of said edge portions to define a longitudinal shoulder adjacent each of said edge portions, the cross sectional thickness of said side member at a first of said shoulders being greater than the cross sectional thickness of said side member at a second of said shoulders;

a resiliently deformable elongated base member mountable on said support structure and having a side remote from said support structure and at each of its opposite longitudinal margins a pair of ridges extending outwardly from said side of said base member to define a channel therebetween which is shaped to receive either one of said shoulders of said side member, a first ridge of said pair of ridges having a lip extending toward a second ridge of said pair of ridges and projecting into said depression when said either one of said shoulders is received within said channel, said lip defining a mouth of said channel having a cross sectional width less than the maximum cross sectional width of said channel, said cross sectional width of said mouth being less than the cross sectional thickness of said side member at said either one of said shoulders; and a cover member identical to said base member, whereby when said first shoulders of each of said side members are respectively received within said channels of said base member and said second shoulders of each of said side members are respectively received within said channels of said cover member, said cover member may be readily removed from said side members for access to the interior of said wireway while said side members are securely retained by said base member.

20. A wireway as set forth in claim 19, wherein said second ridges of said base member extend respectively from each of said longitudinal margins; and said first ridge is disposed inwardly from said second ridge on said base member.

21. A wireway as set forth in claim 19, wherein at least one of said side members has a plurality of wire access and ventilating openings extending therethrough.

22. A wireway as set forth in claim 19, further comprising:
a first of said depressions having a slope extending downwardly from a first of said shoulders which is steeper than a slope of a second of said depressions extending downwardly from a second of said shoulders.

23. A wireway as set forth in claim 22, wherein
said second ridges of said base member extend respectively from each of said longitudinal margins; and
said first ridge is disposed inwardly from said second ridge on said base member.

24. A wireway as set forth in claim 22, wherein at least one of said side members has a plurality of wire access and ventilating openings extending therethrough.

25. A wireway as set forth in claim 22, wherein
said lip of said first ridge is disposed substantially parallel to said side of said base member and includes a retaining surface facing a base of said channel; and
said slope of said first depression is substantially perpendicular to said side of said side member.

26. A wireway as set forth in claim 25, wherein at least one of said side members has a plurality of wire access and ventilating openings extending therethrough.

27. A wireway as set forth in claim 25, wherein
said second ridges of said base member extend respectively from each of said longitudinal margins; and
said first ridge is disposed inwardly from said second ridge on said base member.

28. A wireway as set forth in claim 27 wherein at least one of said side members has a plurality of wire access and ventilating openings extending therethrough.

* * * * *